United States Patent

[11] 3,627,765

[72] Inventor Masaaki Tsurushima, Kyoto, Japan
[21] Appl. No. 859,554
[22] Filed Sept. 19, 1969
[45] Patented Dec. 14, 1971
[73] Assignee Takeda Chemical Industries, Ltd. Higashi-ku, Osaka, Japan
[32] Priority Sept. 20, 1968
[33] Japan
[31] 43/68052

[54] METHOD FOR THE PRODUCTION OF 2-SUBSTITUTED-4-AMINO-5-ACYLAMIDOMETHYLPYRIMIDINE
7 Claims, No Drawings

[52] U.S. Cl............................................. 60/256.4 N, 260/465.7
[51] Int. Cl......................................................... C07d 51/46
[50] Field of Search............................................ 260/256.4 N

[56] References Cited
UNITED STATES PATENTS
3,472,850 10/1969 Isurushima et al............ 260/256.4
3,515,743 6/1970 Tsurushima et al........... 260/465.7

Primary Examiner—Alex Mazel
Assistant Examiner—R. V. Rush
Attorney—Wenderoth, Lind & Ponack ABSTRACT: Compounds of the formula

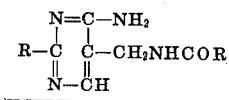

wherein R is lower alkyl or phenyl, such compounds being useful as intermediates in the preparation of vitamin $B_1$ or other pyrimidine derivatives, are synthesized by reacting 1,3-dihalogeno-2-cyanopropene with an amidine of the formula

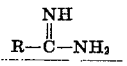

wherein R has the same meaning as above, and subjecting the resultant product to hydrolysis.

METHOD FOR THE PRODUCTION OF 2-SUBSTITUTED-4-AMINO-5-ACYLAMIDOMETHYLPYRIMIDINE

This invention relates to a method for the production of compounds of great value for use as intermediates in the preparation of vitamin $B_1$ or other pyrimidine derivatives.

More concretely, this invention relates to a novel method for the production of 2-substituted -4-amino-5-acylamidomethylpyrimidine compounds represented by the formula

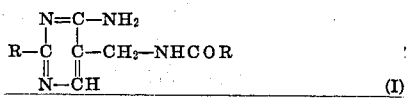 (I)

wherein R is lower alkyl or phenyl, which comprises reacting 1,3-dihalogeno-2-cyanopropene represented by the formula

 (II)

wherein X is halogen, with an amidine represented by the formula

 (III)

wherein R has the same meaning as above, and subjecting the resultant product to hydrolysis.

The object of the present invention is to provide a novel method for the production of 2-substituted-4-amino-5-acylamidomethylpyrimidine (I) useful as an intermediate in the preparation of vitamin $B_1$ or other pyrimidine derivatives.

Another object of this invention is to provide a novel method for the production of 2-substituted-4-amino-5-acylamidomethylpyrimidine (I) which may be carried out with ease and in high yield.

The lower alkyl group represented by R in the above formulas (I) and (III) may be exemplified by methyl, ethyl, propyl, etc. The halogen group represented by X in the above formula (II) may be exemplified by chlorine, bromine or iodine.

The desired 2-substituted-4-amino-5-acylamidomethylpyrimidine (I) is prepared by reacting 1,3-dihalogeno-2-cyanopropene (II) and amidine (III), followed by hydrolysis.

The present reaction is quite unique and unexpected in this kind of art. Though its mechanism has not been fully clarified as yet, it is supposed that it proceeds in a manner as shown by the following scheme:

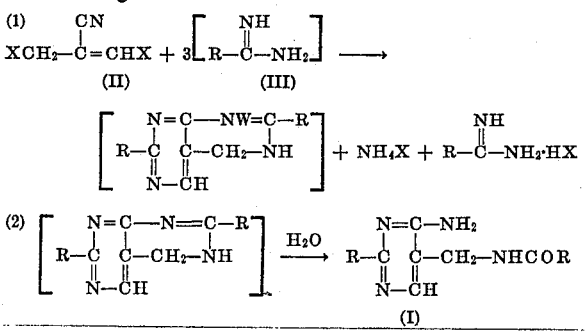

wherein R and X have the same meaning as above.

1,3-dihalogeno-2-cyanopropene, which is used as one of the starting materials in this reaction, may be either the cis-form as represented by the formula

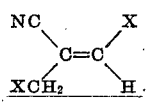

wherein X has the same meaning as above, or the trans-form as represented by the formula

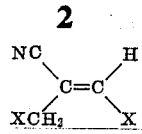

wherein X has the same meaning as above. Taking the dichloro compound as an example, its cis- and transisomers boil at 105° C./20 mm.Hg and 86° C./20 mm.Hg, respectively, both being colorless liquids. The dichloro compound can be synthesized, for example, by gas-phase chlorination of methacrylonitrile or 3-chloro-2cyanopropene-1. In general, use of the trans-isomer appears to give higher yields than the cisisomer. However, in practice, a mixture of these two isomers may also be employed as starting materials of this reaction without any substantial lowering of the yield of the desired product.

Theoretically, in the method of this invention, 1,3-dihalogeno-2-cyanopropene reacts with the amidine at a molar ratio of about 1;3. Practically, an excess amount of amidine may be used, and the unreacted amidine can then be easily recovered from the resulting mixture.

The reaction between the compound (II) and the compound (III) may be carried out at room temperature (about 15° to 35° C.), or if desired, may be accelerated at an elevated temperature, e.g. about 40° to about 140° C.

Though the reaction proceeds without the use of any solvent, it is advantageous to carry out the reaction in the presence of a convenient solvent which does not hinder the reaction.

Among the solvents employed for this purpose, there may be mentioned for example, alcohols such as methanol or ethanol, ketones such as acetone or methyl ethyl ketone and hydrocarbons such as n-hexane, benzene, toluene, xylene and the like.

Other conditions such as reaction time, should suitably be selected in accordance with the amount and kind of starting materials and/or reaction solvent employed.

When the amidine is available as an acid salt, e.g. hydrochloride, sulfate, etc., it is preferable that the acid salt of the amidine be converted to its free base by reacting therewith a theoretical amount of alcoholate e.g. sodium methylate, sodium ethylate, potassium methylate), and then reacting the free base of the amidine with 1,3-dihalogeno-2-cyanopropene.

The resultant product obtained by the above reaction is then, either in the reaction mixture or after its separation or purification, subjected to hydrolysis.

The hydrolysis of the resultant product is carried out by any per se known procedure, for example, by allowing water to act upon the resultant product at a temperature of about 60° to about 100° C.

Thus, the desired 2-substituted-4-amino-5-acylamidomethylpyrimidine (I) is produced.

In the following examples, the relationship between part(s) by weight and part(s) by volume is the same as that between grams and milliliters.

EXAMPLE 1

To 18.0 parts by weight of propionamidine are added 80 parts by volume of methanol and 7.5 parts by weight of cis-1,3-dichloro-2-cyanopropene, and the resulting mixture is refluxed for 6 hours. Then, the reaction mixture is concentrated to dryness under reduced pressure, and 12 parts by volume of water is added to the residue so as to effect the required hydrolysis, which is carried out at 90° C. for 1 hour. After cooling, the resulting crystals are recovered by filtration, whereupon 5.5 parts by weight of 2-ethyl-4-amino-5-propionylamidomethylpyrimidine is obtained. (Yield: 48 percent).

EXAMPLE 2

To 29 parts by weight of acetamidine, 100 parts by volume of benzene is added, followed by the addition of 6.8 parts by weight of trans-1,3-dichloro-2-cyanopropene. The mixture is refluxed for 8 hours, at the end of which time the benzene is distilled off under reduced pressure. To the residue is added 20 parts by volume of water to effect the required hydrolysis conducted at 90° C. for 1 hour. After cooling, the resulting crystals are recovered by filtration, whereupon 6.8 parts by weight of 2-methyl-4-amino-5-acetamidomethylpyrimidine semihydride is obtained (Yield: 72 percent).

EXAMPLE 3

To 29 parts by weight of acetamidine is added 100 parts by volume of acetone, followed by the addition of 7.8 parts by weight of 1,3-dichloro-2-cyanopropene (a mixture of cis- and transisomer). The mixture is refluxed for 10 hours, at the end of which time it is concentrated to dryness under reduced pressure. Thereafter, the same procedure as described in example 1 is followed to obtain 6.2 parts by weight of 2-methyl-4-amino-5-acetamidomethylpyrimidine. (Yield: 66 percent).

EXAMPLE 4

To a methanolic solution of sodium methylate, which has been prepared from 6.4 parts by weight of metallic sodium and 100 parts by volume of methanol, 27.2 parts by weight of propionamidine hydrochloride is added. The mixture is stirred at room temperature for 30 minutes to obtain the free propionamidine. To this product, 7.5 parts by weight of cis-1,3-dichloro-2-cyanopropene is added, and the resulting mixture is refluxed for 6 hours. The sodium chloride that has separated is filtered off, and the filtrate is concentrated to dryness under reduced pressure. Ten parts by volume of water is added to the residue to effect the required hydrolysis conducted at 90° for 1 hour. After cooling, the resulting crystals are recovered by filtration. The procedure yields 5.5 parts by weight of 2-ethyl-4-amino-5-propionylamido-methyl-pyrimidine. (Yield: 48 percent)

EXAMPLE 5

To 26.4 parts by weight of benzamidine is added 80 parts by volume of methanol, followed by the addition of 6.8 parts by weight of trans-1,3-dichloro-2-cyanopropene. The mixture is refluxed for 8 hours, at the end of which time it is concentrated to dryness under reduced pressure. The dried substance thus obtained is washed with water and then dissolved in a mixture of 40 parts by volume of an aqueous solution of sodium hydroxide (10 percent) and 120 parts by volume of ethanol, followed by heating at 90° C. on a water bath for 3 hours. Insolubles are filtered off from the reaction mixture, and the filtrate is cooled to give 4.6 parts by weight of 2-phenyl-4-amino-5-benzoylamidomethylpyrimidine. (Yield: 30 percent).

What is claimed is:

1. A process for the production of a compound of the formula

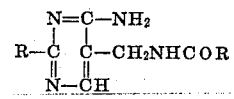

wherein R is lower alkyl or phenyl, which comprises contacting an excess amount of an amidine of the formula

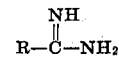

wherein R has the same meaning as above, with a cyanopropene compound of the formula

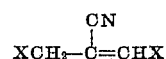

wherein X is chlorine, bromine or iodine, at a temperature within the range from room temperature to 140° C. and subjecting the resultant compound to hydrolysis.

2. A process according to claim 1, wherein the amidine is acetamidine.

3. A process according to claim 1, wherein the amidine is propionamidine.

4. A process according to claim 1, wherein the amidine is benzamidine.

5. A process according to claim 1, wherein the cyanopropene compound is 1,3-dichloro-2-cyanopropene.

6. A process according to claim 5, wherein the 1,3-dichloro-2-cyanopropene is of the trans-form.

7. A process according to claim 1, wherein the molar ratio of the cyanopropene compound to the amidine is about 1:3.

* * * * *